United States Patent
Askew

[11] 3,798,792
[45] Mar. 26, 1974

[54] EDUCATIONAL WORD-FORMING METHOD AND DEVICE

[76] Inventor: Jack K. Askew, 608 W. Mitchell Ave., Clovis, Calif. 93612

[22] Filed: Nov. 22, 1971

[21] Appl. No.: 201,095

Related U.S. Application Data

[63] Continuation-in-part of Ser. No. 131,888, April 9, 1971, abandoned.

[52] U.S. Cl. .................................. 35/9 D, 35/35 D
[51] Int. Cl. .............................................. G09b 5/00
[58] Field of Search .......... 35/9 D, 9 R, 35 R, 35 D, 35/73

[56] References Cited
UNITED STATES PATENTS

| | | | |
|---|---|---|---|
| 3,654,706 | 4/1972 | Perrella | 35/9 D |
| 3,252,230 | 5/1966 | Donev | 35/9 D |
| 2,853,799 | 9/1958 | Magnussen et al. | 35/9 D |
| 2,872,741 | 2/1959 | Krueger et al. | 35/9 D |
| 2,505,230 | 4/1950 | Composto | 35/9 D X |
| 2,539,077 | 1/1951 | Hawkins | 35/9 D X |
| 2,838,847 | 6/1958 | Zalkind | 35/9 D |
| 3,154,863 | 11/1964 | La Prelle | 35/9 R |

Primary Examiner—Wm. H. Grieb

[57] ABSTRACT

The method disclosed provides for the various combinations of three letters which will form a word to be represented by utilizing the intersection points of three rectangular grids placed side by side in left to right relationship. In the first grid I assign a number of grid points to a selected first letter equal to the number of two letter combinations which can form three letter words. In the second grid the said grid points represent the possible second letter combinations of the selected first letter in the first grid. In the third or right hand grid, these same grid points represent all third letters which will combine with the two letter combinations to form a word. For instance, grid points in line one, rows 15 through 19, represent B in the first grid, A, E, I, O, and U, respectively, in the second grid, and in the third grid, the line one, row 15 grid point represents D, G, R, T, Y, and N to form BAG, BAR, BAT, BAY and BAN, the line one, row 16 grid point represents D, E, G, and T to form BED, BEE, BEG and BET, and so forth.

18 Claims, 16 Drawing Figures

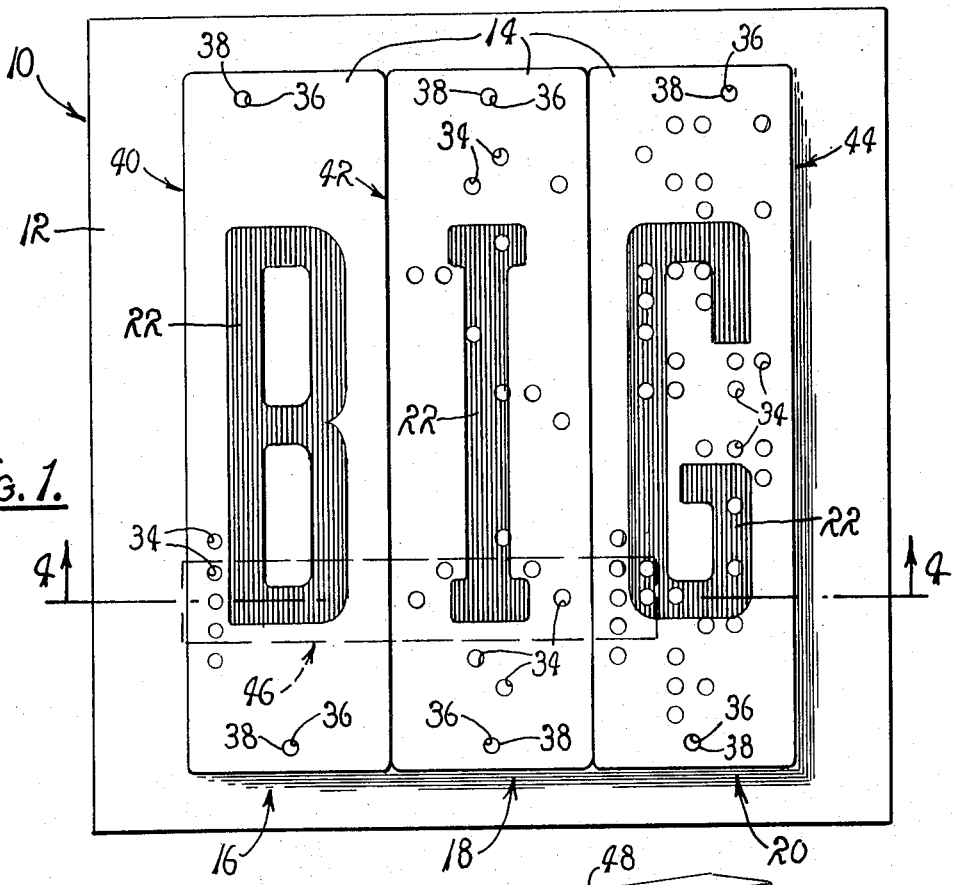

JACK K. ASKEW
INVENTOR

JACK K. ASKEW.
INVENTOR

Vergil L. Gerard
ATTORNEY

JACK K. ASKEW
INVENTOR

Vergil L. Gerard
ATTORNEY

EDUCATIONAL WORD-FORMING METHOD AND DEVICE

This application is a continuation-in-part of copending application by the same inventor, Jack K. Askew, Ser. No. 131,888, filed Apr. 9, 1971, now abandoned, and entitled EDUCATIONAL WORD-FORMING METHOD AND DEVICE.

In a first embodiment of my device the grid intersections are represented by holes in a base with three laterally aligned sections. Letter plates which have code holes representing the particular letter displayed are placed over each section, and a correct word is indicated when the three letter plates placed on the base have code holes positioned to receive a test frame with three aligned prongs. Because of the number of words possible in this first embodiment, a separate set of letter plates is used for each section of the base.

In a modification of this embodiment, an electrical circuit is used to indicate a correct word. To accomplish this each of the base holes is replaced by a pair of separated contacts and the code holes in the letter plates are replaced by contact connectors.

In a second embodiment I reduce the number of correct answers to six and use the same set of letter plates for all three sections. In this form, the correct word indication is electrical and each correct word has a separate circuit which illuminates a pictorial representation of the word on a display panel connected to the base.

In a modification of this form, the grid points are represented by circles on the transparent cover of a letter pocket on the base, and the letters are identified by code dots on the letter plates which register with grid point circles to form a predetermined pattern.

BACKGROUND OF THE INVENTION

This invention relates generally to educational methods and devices and more particularly to methods and devices which utilize a set of plates with letters or numbers to form words or mathematical problems and indicate a correct answer whenever a correct combination is formed.

Modern educational techniques indicate that manipulative devices often serve as excellent teaching aids because they hold the pupils' interest and make learning more enjoyable. Such devices are now in considerable demand because of the current national goal of better education for more children and the limited number of adequately trained teachers and funds with which to achieve this goal. The manipulative devices heretofore developed have not satisfied this need, however, because they are either too difficult to operate, too expensive, or they lack the proper combination of versatility and simplicity to hold the user's interest.

Prior devices of this type have been developed, for example, which utilize letter plates assembled in line to form a word, or a mathematical problem and some have means to indicate a correct solution when a proper combination is formed. Many of these devices, however, are so constructed that the correct solution is obvious before it is formed, and, therefore, provide no substantial learning benefit. Others are too complex for a beginning reader to operate, too expensive for wide use, or are not sufficiently versatile to hold the user's interest.

It is, therefore, a major object of my invention to provide a method and apparatus for educating beginning readers in the art of forming words which utilize a plurality of grid points to represent letters and letter combinations.

It is also an object of my invention to provide an educational apparatus which utilizes a plurality of plates positionable upon a base to form words and mathematical problems and has means that indicate a correct answer whenever a proper combination is formed.

It is another object of my invention to provide a method and apparatus of the type described in which the correct formation of a word or problem is not indicated in advance to the user.

It is a further object of my invention to provide a method and apparatus of the type described which is capable of adoption to numerous educational exercises.

It is still another object of my invention to provide a method and apparatus of the type described which, by appropriate embodiment of the method, can be made to indicate the letter combinations representing all possible words of a designated number of letters.

It is yet a further object of my invention to provide a method and apparatus of the type described which is simple to use, inexpensive to construct, and has sufficient versatility to maintain the interest of the user.

DRAWINGS

These and other objects and advantages of my invention will become more readily apparent from the following detailed description of preferred embodiments and the accompanying drawings in which:

FIG. 1 is a plan view of a first embodiment of my invention showing the base with three sections oriented from left to right and three letter plates mounted thereon to form a word.

FIG. 2 is a perspective view of the base, sections, letter plates and correct combination tester of my first embodiment;

FIRST EMBODIMENT

Figure 3:
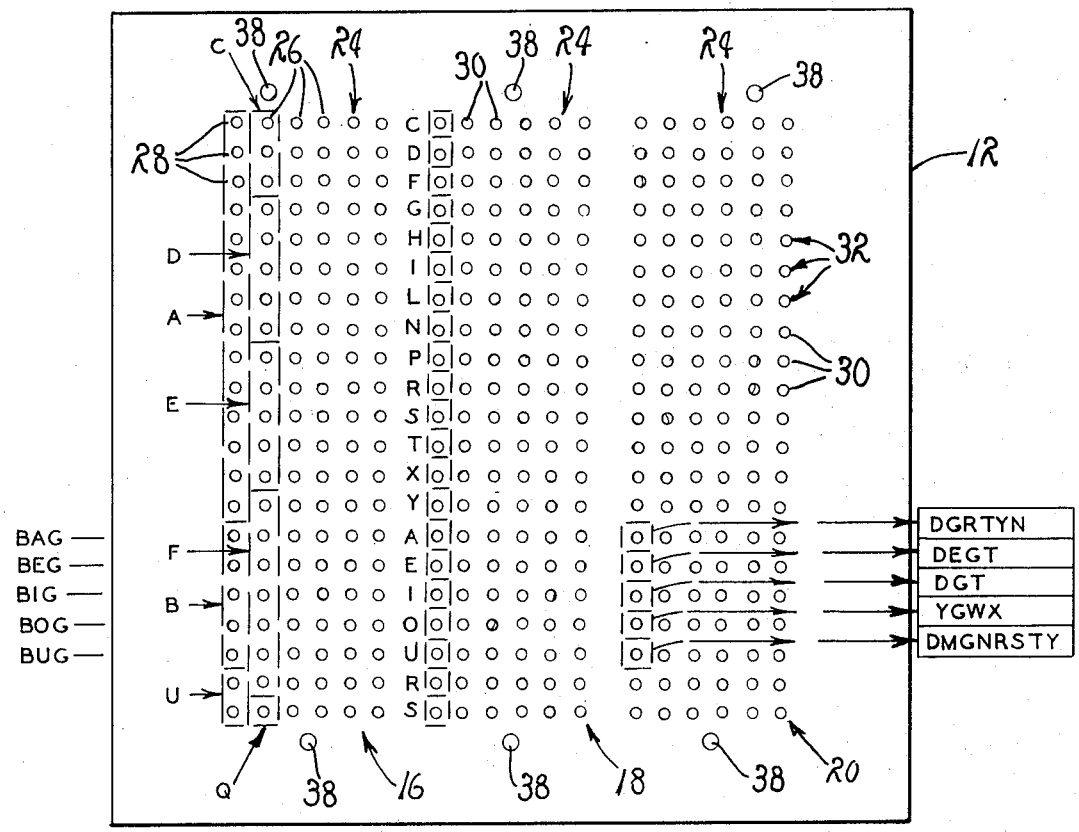
FIG. 3 is a plan view of the base of my first embodiment with the letter plates removed to show the grids constituting the three sections.
Figure 4:
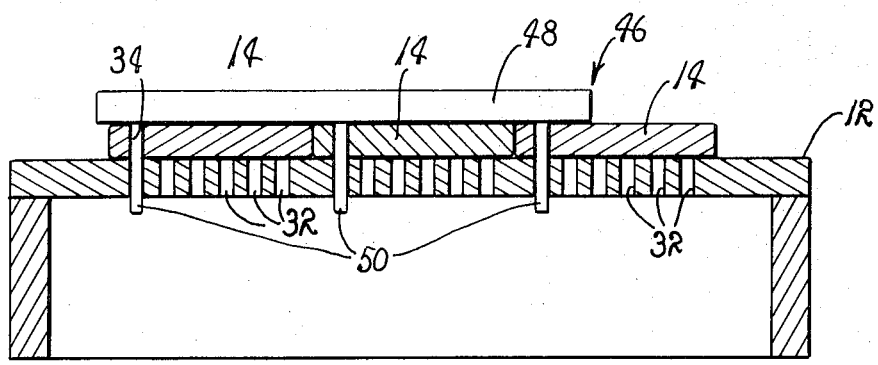
FIG. 4 is a sectional side elevational view of my first embodiment taken on line 4—4 in FIG. 1.
Figure 5:
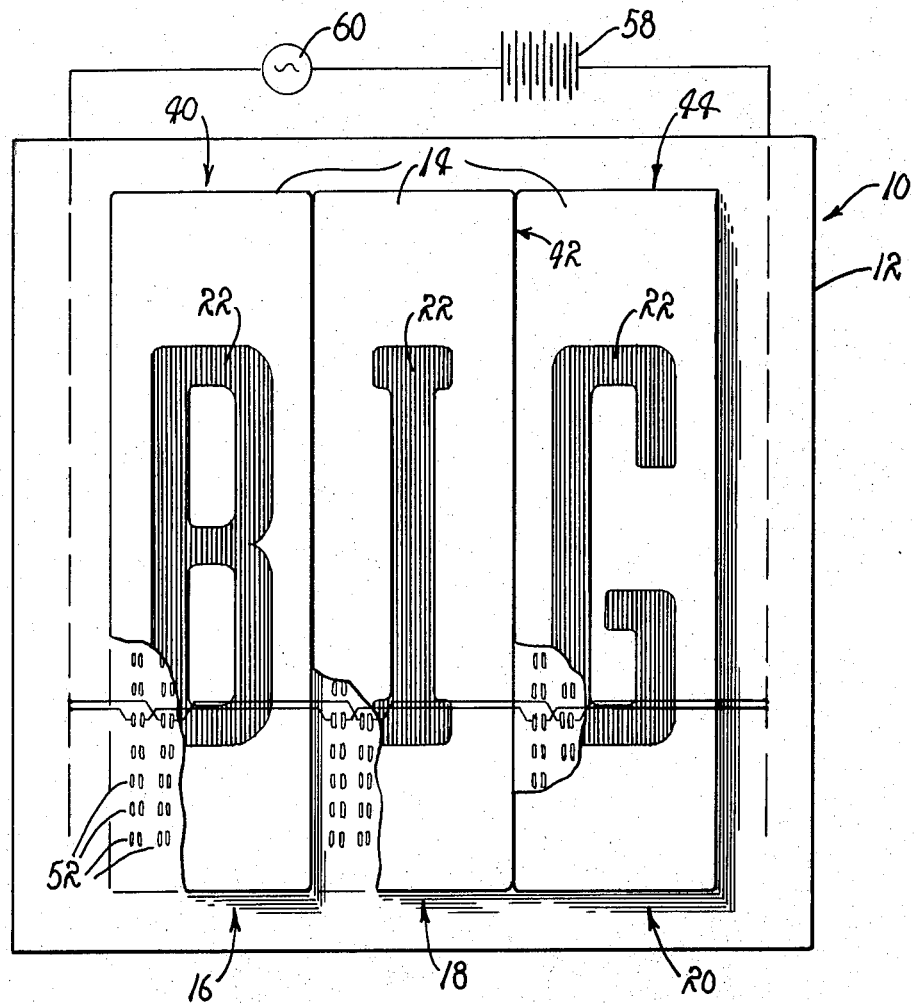
FIG. 5 is a plan view of a modified form of my first embodiment which provides for electrical testing of the correct combinations.
Figure 6:
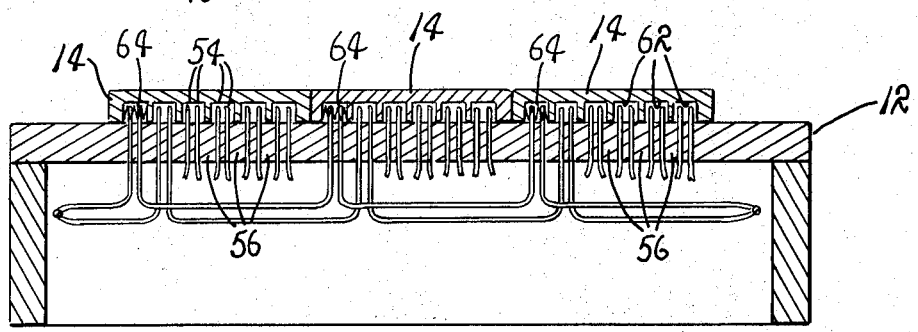
FIG. 6 is a side elevational cross-sectional view of the modified form of my first embodiment shown in FIG. 5.

Referring now to the drawings and particularly to FIGS. 1 through 4, I show a first preferred embodiment of my invention, designated generally by the numeral 10. The device consists of a generally rectangular box-shaped base 12 with letter plates 14 positioned on its upper surface in left to right relationship from the aspect of the user.

The base 10 has three sections on its upper surface for receiving the three letter plates 14, a first, or left hand, section 16; a second, or center, section 18; and a third, or right hand, section 20. Each of the letter plates 14 has a letter on its upper surface so that when a letter plate is placed in each of the sections 16, 18 and 20 of the base 12 they form a three letter combination from left to right, and if the letters are properly chosen they will form a three letter word.

As best shown in FIGS. 2 and 3, a grid 24 is formed in each of the sections 16, 18 and 20 by means of six longitudinal lines 26 and 21 lateral rows 28 to provide 126 intersection or grid points 30. The method utilized by my invention is to assign a group of grid points 30 to each possible first letter of a three letter word. For example, the letter B is assigned five grid points 30 in the first line 26 of the grid in first section 16 (i.e., rows 15 through 19). The letter B is assigned five grid points 30 because it will combine with five different second letters to form three letter words. That is, the letter B combined with A, E, I, O, or U as a second letter will form one or more three letter words such as BAD, BAG, BAT, BEG, BET, BID, BIG, etc.

In the second section 18, the same five grid points are assigned to the first letter B (or the B group), however, these grid points each represent a different one of the five second letters (i.e., A, E, I, O, and U). In the third section 20, the same five grid points are again assigned to the B group, however, here each grid point 30 represents all of the third letters which will combine with the first two letters in that particular row 28 to make a word. For example, in the first row 28 of the B group (i.e., row 15), the grid point 30 in the third section 20 will represent D, G, R, T, Y, and N, since each of these letters will combine with the letters BA to form a word (e.g., BAD, BAG, BAR, etc.). In the second row of the B group (i.e., row 16) the grip point 30 in the third section will represent all third letters which will combine with the first two letters BE of that row to form a word (i.e., D, E, G, and T, and so forth) as illustrated in the following table:

| B Group Row Number | First Section | Second Section | Third Section |
|---|---|---|---|
| 1 (row 15) | B | A | D G R T Y N |
| 2 (row 16) | B | E | D E G T |
| 3 (row 17) | B | I | D G T |
| 4 (row 18) | B | O | Y G W X |
| 5 (row 19) | B | U | D G M N R S T Y |

From this explanation, it will be apparent that for a particular first letter group, groups of grid points 30 in the first section 16 all represent that letter (i.e., line 1, rows 15 through 19 all represent B) while each grid point 30 of the same group og grid points in the second section 18 represents a separate single letter (i.e., A, E, I, O, and U), and the grid points 30 of the same group in the third section 20 each represent a number of different letters (i.e., line 1, row 15, grid point represents D, G, R, T, Y and N). By this method I am able to identify a number of predetermined words by combining like grid points in each of the sections. By properly coding the letter plates 14 used in each of the sections 16, 18 and 20 to correspond to particular grid points, it can then be readily ascertained whether three combined letters form a word. If the letters from a word, the grid points 30 in the same line 26 of each section and in the same row 28 across the base 12 must interrelate.

The required interrelationship is incorporated into the letter plates 14 shown in FIGS. 1 and 2, by providing base holes 32 at each of the grid points 30 in base 12, and code holes 34 in each of the letter plates 14. Because of the physical limitations involved in coding the letter plates 14 for all possible three letter words, if the letter plates are coded for use in any of the three sections 16, 18 and 20, separate sets of letter plates are used for each section. Confusion between the letter plates of each set is avoided by indexing holes 36 in the letter plates and indexing pins 38 on the base. The letter plates 14 of the first section letter set 40 have their upper indexing hole 36a, and the corresponding indexing pin 38a on base 12, offset to the left from the lower indexing hole 36b and indexing pin 38b. The letter plates of the second section letter set 42 have their indexing holes and pins nearly aligned vertically, and the letter plates of the third section letter set 44 have their upper indexing hole and pin offset to the right of the lower indexing hole and pin. It is also possible, of course, to relate the letter sets to their corresponding sections by other means such as color coding, however, the indexing hole and pin arrangement described is simple to incorporate and provides a positive control. It also assures that the letter plates will be placed on the sections with their top end upward, which is particularly important with a symmetrical letter such as I To locate the code holes 34 in each of the letter plates 14 of each of the letter sets 40, 42 and 44, I proceed as follows. Taking the B-letter plate of the first section letter set 40, I provide code holes in the letter plate corresponding to the B-group grid points 30 in the first section (see FIG. 3). Since this letter plate is used only in the first section 16, no other code holes are necessary. The same procedure is followed for every other letter plate in the first section letter set 40, these being all of the possible first letters for three letter words. As indicated by FIG. 3, the A-group takes 14 grid points 30, the B-group takes five grid points, and the U-group takes two, thus consuming all the first line grid points. In the second line of the section 16 grid, the C-group takes three grid points, the D- and E-groups each take five, the F-group takes seven, and the Q-group takes one. The remainder of the grid points 30 in the section 16 grid are assigned to other first letters in a similar manner, all as shown in Table I set forth below.

The second section letter set 42 is encoded by relation to the first section letter groups. That is, the letters A, E, I, O, and U are each provided with a code hole 34 in the first line 26 and on each of the B-group rows 28, respectively. To relate to other letter groups of first section letters, by forming the second letter of a three letter word in that group, the letter plates of the second section letter set 42 are also encoded for that relationship. For example, A-letter plate of the second section letter set 42 has a second letter relationship to the first letter groups of C, D, F, etc. It must, therefore, be encoded for each of these relationships in the same manner as it was for its relationship for the B-group.

Finally, the letter plates of the third section letter set 44 are encoded by providing code holes 34 at each grid point 30 which relate to a first section letter group. For example, letter plate G of the third section letter set will be provided with a code hole on the first line 26 of the third section at the third row 28 of the B-group (i.e., row 17) since it relates to the BI combination by forming the word BIG. It will also be provided with code holes in the same line 26 at all the other B-group rows since it relates to these other letter combinations by forming the words BAG, BEG, BOG, and BUG. The total letter relationship for encoding the letter plates 14 for all three letter words is shown in Tables I and II below.

TABLE I

| First Line | Second Line | Third Line | Fourth Line | Fifth Line | Sixth Line |
|---|---|---|---|---|---|
|  |  | C-3 | G-5 | K-2 | O-7 | S-8 |
| A-14 | D-5 | H-5 | L-5 | P-6 | T-7 |
| B-5 | E-5 | I-6 | M-5 | R-6 | V-3 |
| U-2 | F-7 | J-5 | N-5 | Z-2 | Y-3 |
|  | Q-1 |  | W-4 |  |  |

TABLE II

AC—( ET)
AD—( EO)
AF—( T)
AG—( EO)
AH—( A)
AI—( DRLM)
AL—( ELMP)
AN—( DTY)
AP—( E)
AR—( OEKMT)
AS—( KPS)
AT—( E)
AX—( E)
AY—( E)
AY—( E)

BA—( DGRTYN)
BE—( DEGT)
BI—( DGT)
BO—( YGWX)
BU—( DGMNRSTY)

CA—( BDMNPRT)
CO—( BDGPTWY)
CU—( BDEPRT)

DA—( BDMY)
DE—( NW)
DI—( DEGMNP)
DO—( EGT)
DU—( BDEGN)

EA—( RT)
EG—( GO)
EL—( KM)
EN—( D)
ER—( AER)

FA—( DNRT)
FE—( EW)
FI—( GNTXR)
FO—( BEGPX)
FU—( N)

GA—( BDGIMPSY)
GE—( ELMT)
GI—( GN)
GO—( BET)
GU—( MNY)

HA—( DGMSTWY)
HE—( NWXY)
HI—( DEPST)
HO—( BDEGPTW)
HU—( BEGHMT)

MA—( NPRTY)
ME—( NT)
MI—( X)
MO—( EDMOPW)
MU—( DGM)

NA—( BGPY)
NE—( TW)
NI—( LPX)
NO—( DERTW)
NU—(NT)

OA—( FKRT)
OD—( E)
OF—( F)
OL—( D)
OR—( E)
OU_ (TR)
OW—( EL)

PA—( DLNRTWY)
PE—( GNPRTW)
PI—( GNPT)
PO—( DPTWX)
PU—( BGNPST)

QU—( O)

RA—( GMNPTWY)
RE—( D)
RI—( DGMP)
RO—( BDETW)
RU—( BGMNT)
RY—( E)

SA—(DGPTWY)
SE—( ETWX)
SI—( NPRSTX)
SO—( BDGPTWY)
SU—( BMNP)
SH—( E)
SP—( Y)
SK—( Y)

TA—( BDGMNPRX)
TE—( (EN)
TI—( DENP)
TO—( BGMNOPTWY)
TU—( BGX)
TE—( E)
TR—( Y)

UR—( N)
US—( E)

Table II—Continued

IC—( E)
ID—( E)
IL—( KL)
IN—( NK)
IO—( N)
IR—( EK)

JA—( BGMRWY)
JE—( T)
JI—( BG)
JO—( BGTY)
JU—( G)

KE—( GY)
KI—( DT)

LA—( BDGMPWXY)
LE—( DGT)
LI—( DEP)
LO—( BGTWX)
LU—( G)

VA—( NT)
VI—( AEM)
VO—( W)

WA—( GNRSXY)
WE—( DET)
WI—( GNT)
WO—( NOW)

X ..........

YA—( M)
YE—( NT)
YO—( U)

ZI—( GP)
ZO—( O)

After the encoding of letter plate G of the third section letter set for its B-group relationships, it will be further encoded for its relationships with other first section letter groups, such as the C-group where it forms COG, the D-group where it forms DIG, DOG and DUG, and so forth until complete coding is accomplished.

Table I shows the assignments of grid points 30 in the first letter grid of section 16, while Table II shows the second and third letters which must be encoded at corresponding grid points 30 in the second section 18 and third section 20 respectively. From these tables it will be seen that the I-letter plate of the second section letter set 42 will not only have a code hole 34 at the grid point of the first line, 17th row, to relate to the B-group of the first section letter set 40 and form BI, but will have another first line code hole at row six to relate to the A-group of the first section letter set and from AI, and will have other code holes at other grid points for relationship with all the other first letter groups set forth in Table II, all as shown in FIG. 1.

In a like manner, the G-letter plate of the third section letter set 44, in addition to its first line code holes 34 at rows 15 through 19 which relate to the B-group letter plates of the first section letter set 40, will have code holes at other grid points for relationship with all the other first section letter set plates and second section letter set plates set forth in Table II, these code holes also being shown in FIG. I.

It will be understood, of course, that the letter plates of the third section letter set 44, where each grid point represents a group of different letters, will require the most extensive encoding and that the more frequently used third letters will have a rather extensive pattern of code holes. Nevertheless, it is both possible and practical to provide the required code holes even for the most popular third section letter set plates and the grid pattern provided of 126 grid points will provide the necessary grid points to accomplish the desired end. That is, encoding for all three letter words.

With the code holes 34, placed as described, it will be apparent that evidence of a word being formed by three letter plates 14 in the sections 16, 18, and 20 will be given whenever three equally spaced code holes 34 appear in any row 28, since the equal spacing will indicate the code holes to be in the same line 26 of each section as well as in the same row. To readily test for this condition I provide a test jig 46. The test jig 46 has a bar handle 48 with three equally spaced prongs 50 projecting from one side thereof. The test jig 46 is held with the bar handle 48 parallel to the rows 28 and moved over the faces of the letter plates 14 on the base 12 until a pattern of code holes 34 which will accommodate the prongs 50 are located. The prongs 50 are then inserted in the code holes, one prong in the code hole of a letter plate in each of the three sections, and a correct word is proven. Since the first section letter plates have only code holes 34 relating to a single letter group (e.g., B-group of five holes) it is not necessary to scan the full surface of the letter plates, but instead, only to test for code holes aligned with these letter group holes.

In FIGS. 4, 5, 6, 7 and 8, I show a modified form of my first embodiment in which the test jig 46 is replaced by an electrical circuit. This is accomplished by replacing the base holes 32 at each of the grid points 30 with upwardly projecting base contacts 52. The base contacts 52 each consist of a pair of contact legs 54 electrically separated by spacing means 56 (see FIG. 8). Each of the contact legs 54 is connected into an electrical circuit (see FIG. 5) with the base contacts of related grid points in other sections. That is, the base contact 52 for the grid point 30 of the first row 28 of the B-group in the first section 16 is connected in series with the grid point 30 of the first row of the B-group in the second section 18 and in the third section 20, and these series connected base contacts 52 are then electrically connected in circuit with a power source 58 and indicator light 60.

Figure 7:
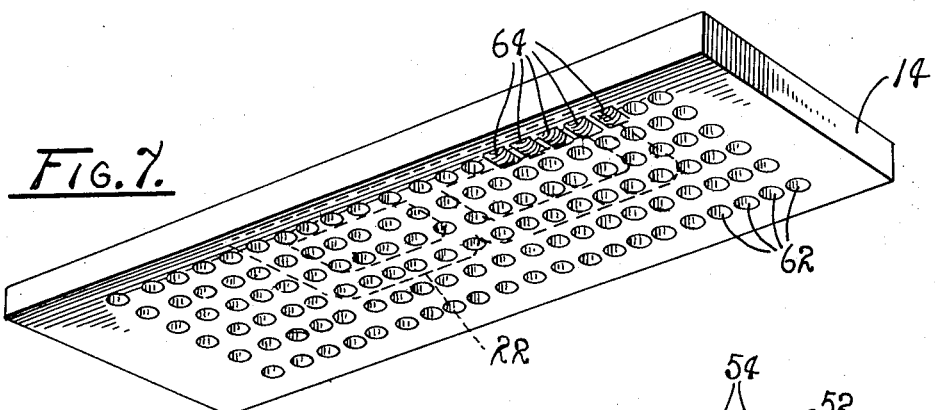
FIG. 7 is a perspective view of the under surface of a letter plate adapted for use with the modified form of my first embodiment shown in FIG. 5.
Figure 8:
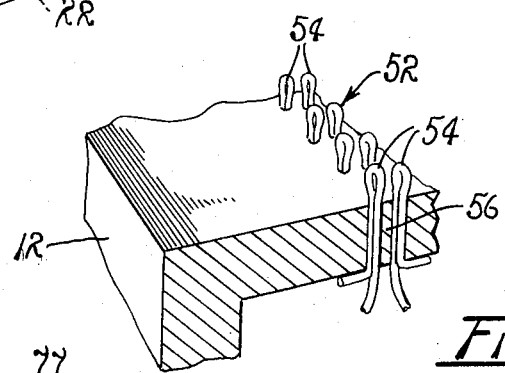
FIG. 8 is a partial perspective cutaway view of the base of the modified form of my first embodiment showing the electrical contacts constituting the grid points.

The letter plates 14 are provided with recesses 62 in the bottom surface to accommodate the base contacts 52, and the code holes 34 are replaced with contact connectors 64 located in selected recesses (see FIG. 7). Thus, the letter plate B in the first section letter set 40 will have contact connectors 64 in each of the recesses 62 corresponding to the five B-group grid points 30, and the letter plates A, E, I, O and U of the second section letter set 42 will have contact connectors 64 in the B-group row to which they relate. The third section letter set 44 will have contact connectors 64 in all recesses 62 corresponding to grid points related to the B-group, and thus positioning letter plate B in the first section 16, letter plate I in the second section 18, and letter plate G in the third section 20 will close the three base contacts 52 in each of these sections connected in series in the third row 28 of the B-groups (i.e., row 17) by engagement of contact connectors 64 in these letter plates with these particular base contacts. The closing of these base contacts will complete the master electrical circuit through the power source 58 and indicator light 60 and illuminate the light.

From this description of the method utilized by my invention and the structure of a first preferred embodiment, it will be understood that the user operates the invention as follows. With the base 12 placed before him, and the letter plates 14 at hand, the user selects a letter plate from the first section letter set 40 and places it in the first section 16. If by chance, the letter plate 14 selected is not from the first section letter set 40 the error will be made apparent because the indexing holes 36 on the letter plate will not fit the indexing pins 38 of the first section.

Assuming that the chosen letter plate from the first section letter set is B, the letter plate will be coded to the B-group grid points 30 in the first section grid 24 either by code holes 34 (as in my first form) or by contact connectors 64 (as in my second form).

Next, the user will try a letter plate from the second section letter set 42 by placing it in the second section 18. Assuming this letter plate is I, it will be coded to the B-group grid points 30 in the second section grid, and will relate to the third row 28 of these grid points.

Finally, the user will try a letter plate from the third section letter set 44 by placing it in the third section 20. Assuming this letter plate is E, it will not be coded to the B-group grid points 30 on the third row 28 but only on the second row of the B-group for BEE.

If the user tests the three letter combination with the test jig 46 (using my first form) the prongs 50 will align with a code hole 34 in the B-letter plate in the first section 16, and with a code hole 34 in the I-letter plate in the second section 18, but not with any code hole in the letter plate E in the third section 20. Or, where my second form is used, the base contacts 52 will be closed by contact connectors in the first section 16, and the second section 18, but not in the third section 20. Thus, the user will be informed that his attempted three letter combination does not form a word.

Assuming the user then removes the E-letter plate from the third section letter set 44 and chooses the G-letter plate from this set, he will then have a word, to wit, BIG. The G-letter plate will be coded to the B-group on the third row 28 by having either a code hole 34 or a contact connector 64 which corresponds to this B-group grid point in the third section grid 24. The correct three letter combination will be indicated by the prongs 50 of the test jig 46 matching code holes in all three letter plates, in my first form, or by illumination of light 60 due to all three series connected base contacts 52 in the third row 28 of the B-group being closed by contact connectors 64 in each letter plate, in my second embodiment. The user will thus be immediately aware that he has been successful in forming a word, and if he does not recognize the word he may be prompted to make inquiry of its meaning, study its letters, and thereby add it to his vocabulary.

Because of the great number of possible combinations, the invention will challenge more skilled readers as well as beginners, and will occupy the user for long periods of time without losing his interest. If desired, the user can be instructed to follow a systematic approach such as starting with the letters BI in the first and second sections, respectively, and forming all possible three letter words from this two letter combination by changing only the third section letter plates. Then he can follow the same procedure with BA, and so forth.

SECOND EMBODIMENT

In FIGS. 9 through 13 I show a second embodiment of my invention in which I have reduced the number of words which may be formed to six for a particular setup and at the same time provided for a pictorial presentation of each correct word. The number of letter plates necessary to operate the apparatus of this second embodiment for a particular setup is also greatly reduced, of course, however, the method remains fundamentally the same.

This second embodiment is adapted primarily to the beginning reader, as will readily be apparent and incorporates the additional feature of identifying the meaning of the correct word as well as indicating its formation. Though only six three letter words can be formed with a particular setup of the apparatus, a much greater number of words can be formed by using different setups, as will be apparent from the following description. The apparatus of my second embodiment is designated generally by the numerial 70 and consists of a base 72 having a playing surface 74 and a display panel 76. In the playing surface 74 three receptacles are formed, aligned from left to right, each corresponding to a first section 78, second section 80 and a third section 82, and adapted to receive letter plates 77.

Although grids are used to code the letter plates as in my first embodiment, the grids 84 in this embodiment have only three longitudinal lines 86 and six lateral rows 88, thus reducing the grid intersections or grid points 90 to a total of 18. Furthermore, only the grid points 90 in the first or left hand line 86 are used in the first section 78, only those in the second or center line 86 are used in the second section 80, and only those in the third or right hand line 86 are used in the third section 82. This is possible, of course, because of the limited number of word combinations for which the apparatus will function.

An additional advantage flows from this relationship of the grid points 90 to each of the three sections, in that the letter plates 77 still have space for physical representation of all grid points and the letter plates may, therefore, be used in any of the three sections 78, 80 and 82, so that separate sets of letter plates for each section are not necessary.

Because of the number of word combinations in my second embodiment is restricted, each of the grid points 90 need represent only one particular letter. Thus, where in my first embodiment a group of grid points was required for a particular first section letter, in my second embodiment the six grid points 90 in the first section 78 represent the letters C, C, D, F, P and O, respectively. In the second section 80, the grip points 90 represent the letters A, O, O, O, I and W, and each relate to different letter in the first section rather than all to a single letter group as in my first embodiment. Finally, the third section grid points 90 also each represent the separate letters T, W, G, X G and L, rather than all possible third letters of a two letter group like BI, as in my first embodiment.

With the grid points 90 thus identified, each row 88 of grid points makes a separate word, as follows:

| Row No. | First Section | Second Section | Third Section |
|---|---|---|---|
| 1 | C | A | T |
| 2 | C | O | W |
| 3 | D | O | G |
| 4 | F | O | X |
| 5 | P | I | G |
| 6 | O | W | L |

Also, since the correct words for which the apparatus is set up all have three different letters (e.g., CAT) rather than having two letters the same such as BEE, and only one word can be formed at a time, letter plates 77 are required for only 12 letters, to wit, C, D, F, P, O, A, I, W, T, G, X and L. If a word with a repeated letter such as BEE were used it could be adapted the same as any other letter plate, of course, but two letter plates for E would be required.

Figure 13:
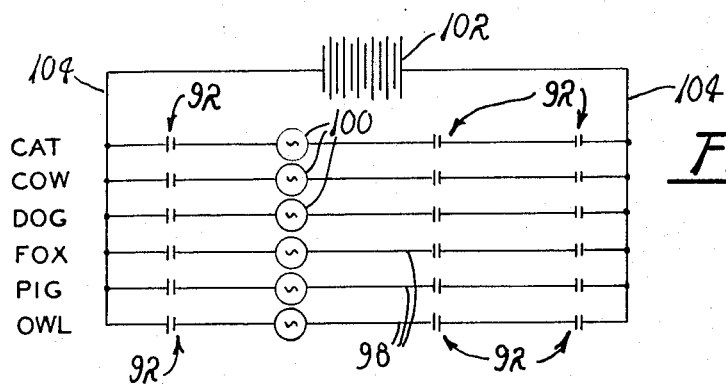
FIG. 13 is a schematic diagram of the electrical circuit in my second embodiment.
Figure 9:
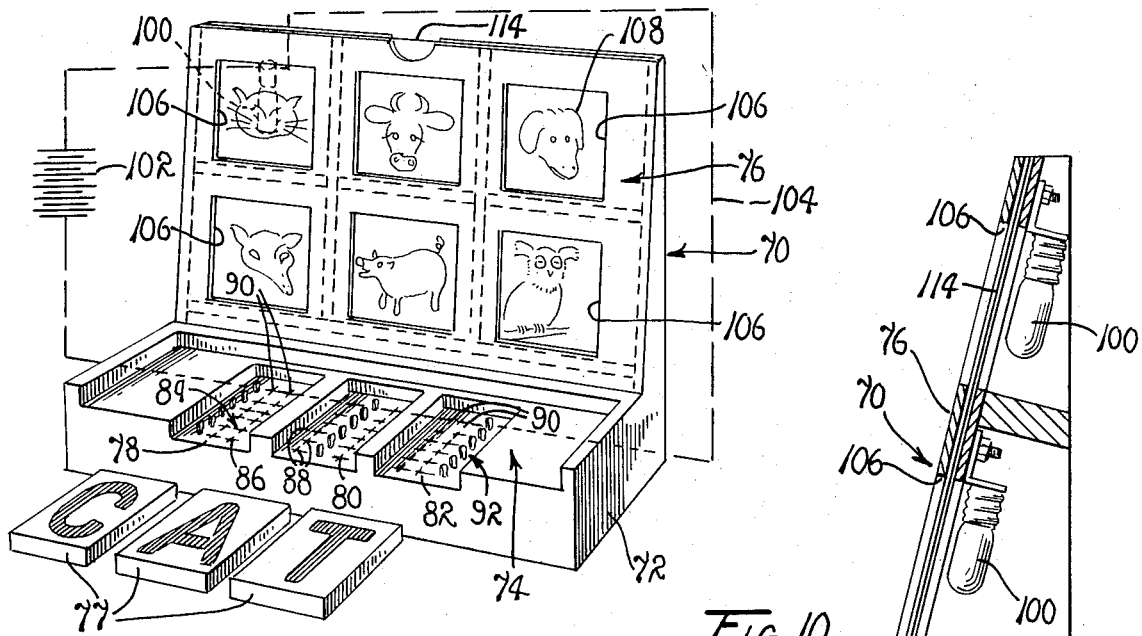
FIG. 9 is a perspective view of a second embodiment of my invention adapted to form a limited number of words, shwoing the base and the letter plates.
Figure 10:
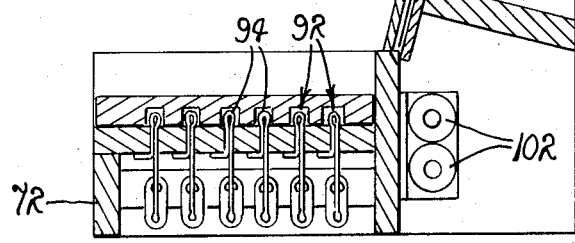
FIG. 10 is an end elevational sectional view of the second embodiment of my invention.
Figure 11:
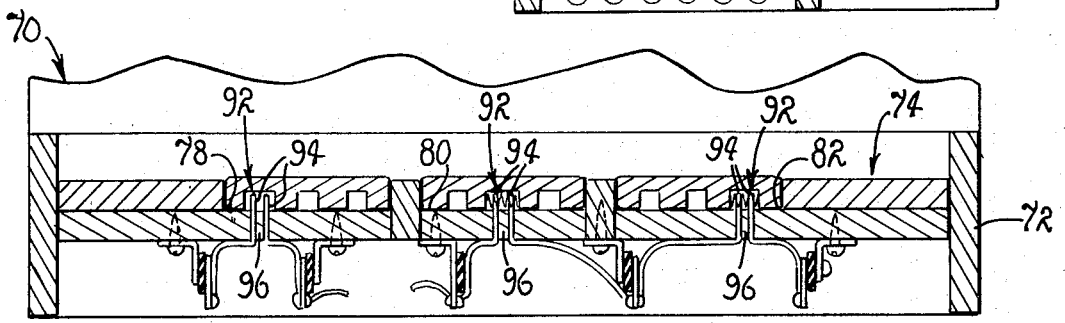
FIG. 11 is a partial sectional front elevational view of my second embodiment showing the means of electrical connection to indicate correct combinations.

In this embodiment, the grid points 90 are represented in each of the sections 78, 80 and 82 by base contacts 92 which project upwardly in each of the section receptacles. The base contacts 92 are each formed of a pair of contact legs 94 separated by spacing means 96. As best shown in FIG. 13, the base contacts 92 in each row 88 are connected in series in a separate circuit which is closed when all three of the contacts are bridged. Each of the row circuits 98 has its own indicator lamp 100 connected in series with the three base contacts 92 and is connected to a single power source 102 by bus connector 104. It will, therefore, be observed that in this embodiment each correct word has its own separate indicator light 100, whereas in the second form of my first embodiment one indicator light 60 served all of the circuits.

The indicator lights 100 are each located behind a separate window 106 provided in the display panel 76 and when illuminated light up a pictorial representation 108 of the word represented by the particular row circuit 98 in which the lamp is located.

The letter plate 77 have 18 recesses 110 in their bottom surface positioned at each of the grid points 90. The letter plates 77 are each coded to a particular letter by means of contact connectors 112 located in recesses corresponding to the grid points which represent that particular letter.

Figure 12:
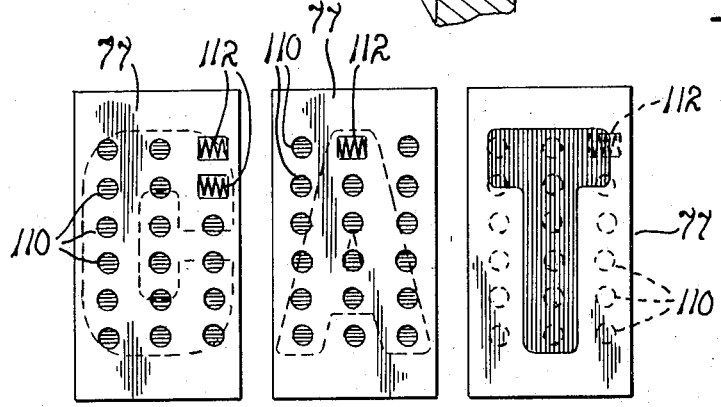
FIG. 12 is a plan view of the upper and under surface of the letter plates utilized in my second embodiment.

For example, the letter plate 77 representing the letter C, as best seen in FIG. 12, has contact connectors at grid points 90 formed by the intersection of the first line 86 and the first and second rows 88. These grid points represent the letter C in the first section 78. The A-letter plate 77 has a connector 112 at the grid point 90 formed by the intersection of the second line 86 and the first row 88 to represent the letter A in the second section 80, and the T-letter plate 77 has a contact connector at the grid point 90 formed by the intersection of the third line 86 and the first row 88 to represent the letter T in the third section 82. Therefore, when these three letter plates are placed in the first, second and third section receptacles, respectively, they bridged the base contacts 92 and close the first row circuit through the indicator light 100 to the bus connectors 104 and power source 102 illuminating the light. Since the letter plate C also has a contact connector 112 at the second row it will close a second row circuit with the letter plates O and W to illuminate COW.

Since the light 100 is placed behind the window 106 in the display panel 76, the pictorial representation in that window is illuminated. The pictorial representations 108 are placed in the display panel 76 by means of a transparent picture sheet 114, which carries six separate pictures each corresponding to a different one of the windows 106. In the embodiment shown the first row circuit light 100 is positioned behind the upper left hand window 106 and the picture corresponding to this window on the picture sheet 114 is a pictorial representation of the correct word represented by the first row circuit 98 to wit, CAT.

The second row circuit light 100 is positioned behind the upper center window 76 and illuminates a picture representing the correct word for the second row circuit 98, to wit, COW, and so forth.

It will thus be understood that in this embodiment, each of the row circuits 98 represents a separate correct word and illuminates a separate pictorial representation 108 of that word in the picture sheet 114.

Where a letter plate 77 represents a letter which is used in more than one word, the letter plate is merely coded for each use by placing a contact connector 112 in each recess which corresponds to a grid point 90 representing that letter. For example, the O-letter plate will have contact connectors at the first line, sixth row grid point to represent the O in OWL, on the second line at the second, third, and fourth row grid points to represent the O in COW, DOG, and FOX, respectively.

The user of my second embodiment starts with the base 72 in front of him and the letter plates 77 at hand. Assuming he first places C-letter plate 77 in the first section 78, and the A-letter plate in the second section 80, but then places the W-letter plate in the third section 82, he will not receive a correct word indication by illumination of a light 100 since this is not one of the correct words for this particular setup and the first row circuit 98 will not be closed since the base contact 90 at the line three, row one grid point will not be bridged. If he then replaces the W-letter plate in the third section 82 with the T-letter plate the first row circuit will be closed and the indicating light of that circuit will illuminate the pictorial representation of CAT. In like manner the user can through experimentation form the other five correct words of this setup and in each case he will be notified by the illumination of a light 100 not only that he has formed a correct word, but what the word represents.

I have periodically in this description of my second embodiment referred to a particular setup, since it should be understood that the use of the apparatus can be greatly expanded by using different set of letter plates 77 and picture sheets 114. For example, the letter plates used in this description can be indexed to the picture sheet by color coding or some other appropriate means, and a second group of letter plates which form different words coordinated to a second picture sheet with different pictures corresponding to these words. By this means the apparatus of my second embodiment can be used for a whole library of different letter plates and picture sheet setups.

Although I have not described the base contacts and contact connectors used to form the electrical indicator circuits in these embodiments in detail, I have found that a great number of different types of structure will adequately serve this function, and that merely forming the contact legs of two wire loops and the contact connectors of a short spiral of wire disposed horizontally serves quite satisfactorily.

Figure 14:
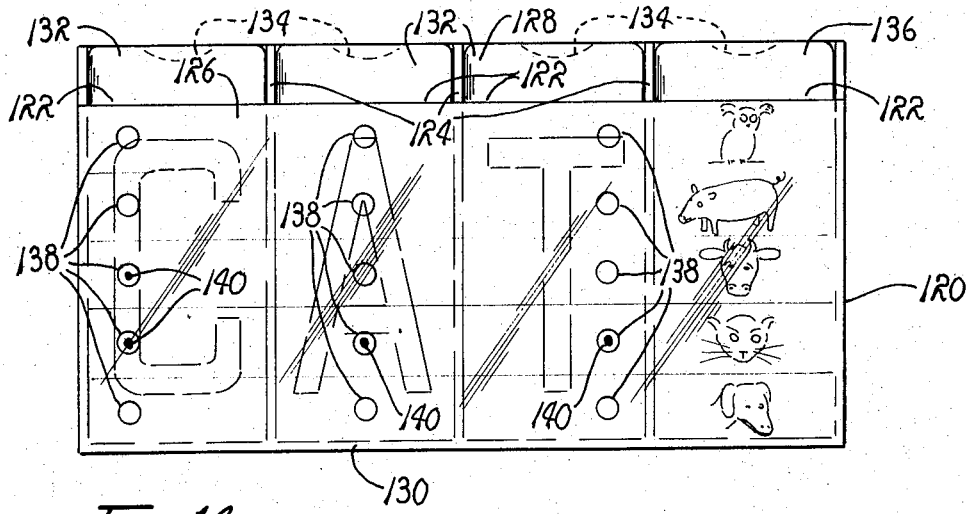
FIG. 14 is a plan view of an alternate form of my second embodiment.
Figure 15:
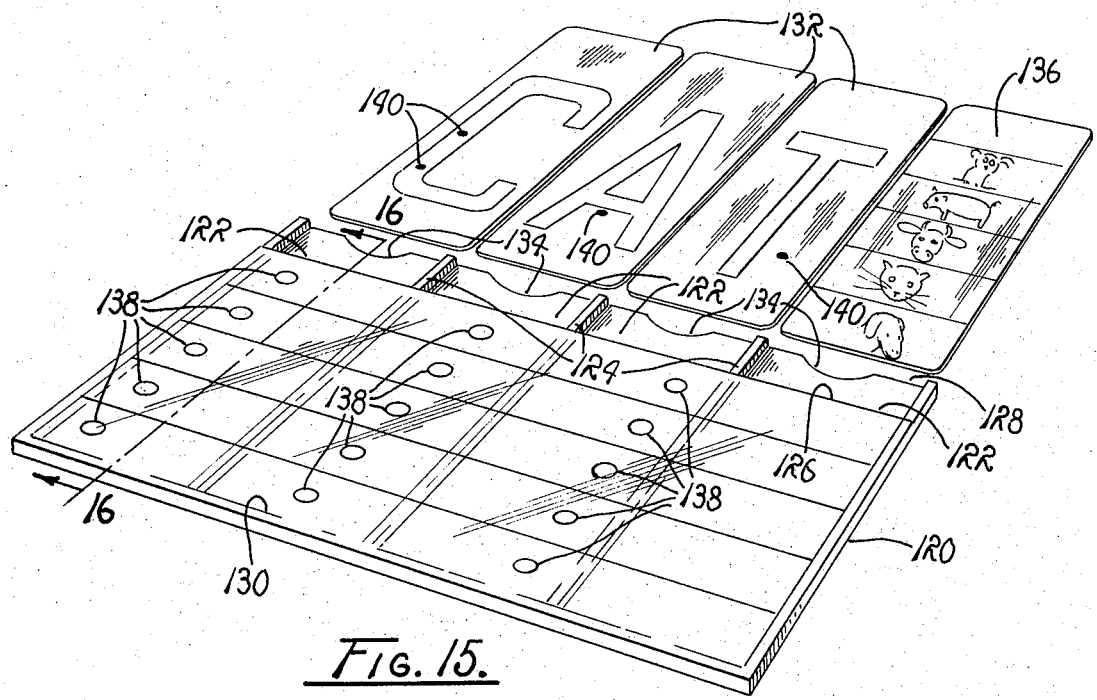
FIG. 15 is an exploded perspective view of the alternate form shown in FIG. 14.
Figure 16:
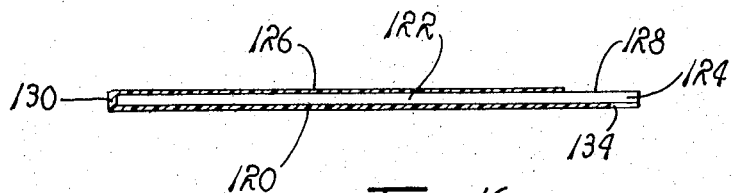
FIG. 16 is a sectional view of the alternate form of my second embodiment taken on line 16—16 in FIG. 15.

In FIG. 14 I show a modified form of my second embodiment in which the base 72 is replaced by base board 120 separated into four compartments 122 by dividers 124 and covered by a transparent sheet 126. The sheet 126 is narrower than the base board 120 leaving an open area 128 at the top of each compartment 122. The bottom of each compartment 122 is closed by a bottom rib 130 formed on the base board.

The letter plates 132 are cards formed from paperboard or plastic and have a length substantially equal to the width of the base board 120, and a width slightly less than the width of the compartments 122. The letter plates 132 are insertable in the compartments 122 and the edge of the base board 120 adjacent the top of the compartments has cut out scallops 134 to facilitate their manual insertion and removal.

In addition to the letter plates 132, a picture plate 136 is provided in this form which inserts in the righthand compartment, as will be more fully explained.

In this form the grid points 138 are represented by circles on the transparent sheet 126 and are similarly disposed to the grid points 90 in my first form. The letter plates 132 are encoded by colored dots 140 on their face. The code dots 140 register with the circles 138 on the transparent sheet 126 to indicate a match and a correct word is evidenced when three letters are inserted in the three lefthand compartments which all indicate a match in lateral alignment. (See FIG. 14)

The picture plate 136 has six pictorial representations, arranged vertically from the aspect of the user and each aligned with one laterally directed row of circles or grid points. The letter plates are so encoded that when three letters each make a match (i.e., dot registers with circle) in lateral alignment, the row of matches also aligns with a pictorial representation of the word. This is best illustrated in FIG. 14 where the top row of laterally aligned matches for the letters CAT align with the pictorial representation of a cat.

As in the first form of my second embodiment, the letter plates 132 are coordinated with the pictorial plate 136 and only the letters necessary to form the six words represented by the pictures on the pictorial plate are included in a single setup. Additional setups may be provided, however, with the letter plates and picture plates coordinated, such as by color coding.

The picture plate 136 projects above the transparent sheet 126 at the top of its compartment 122 the same as the letter plates 132 and a cut out scallop is also provided in the edge of the base board 120 above its compartment for easy insertion and removal.

This second form of my second embodiment illustrates particularly the simplicity with which devices embodying my method can be constructed, and the variety of ways by which the grid points and letter plate coding can be established.

From this detailed description of the method and apparatus of my invention it will be understood that it is fully capable of achieving the objects and providing the advantages which I have attributed to it. Once the basic concept of representing letters or groups of letters by grid points is understood, a great variety of apparatus for embodying this concept is possible. This variety is illustrated by the first embodiment which indicates all correct three letter words as compared with the second embodiment which indicates only six words for a given setup but also represents their meaning.

Certainly, it will be seen that my invention provides a highly useful and educationally helpful device which is not only sufficiently versatile to maintain a user's interest for long periods, but is simple enough for beginning readers and relatively inexpensive to construct.

It will also be understood from this detailed description of my method and preferred embodiment that an apparatus may be constructed in accordance with my invention to form words of four letters or more, and that the letter plates may be encoded to indicate correct two letter and three letter words as well as four letter words, in a four letter word apparatus. Though encoding the letter plates of such a four letter word apparatus could present practical problems in size and spacing because of the number of grid points required, these problems can easily be overcome by merely reducing the number of words which can be formed, as done in my second embodiment.

Although I have described my method and apparatus for use in forming words by the correct combination of individual letters, it can also be used to form mathematical expressions by using numbers and other mathematical symbols in place of letters on the letter plates. For example, simple addition could be performed on my apparatus by replacing the first section letter plate B in my first embodiment with the numeral 4, replacing the second section letter plates A, E, I, O and U with the numbers 0, 1, 2, 3, and 4 (these being all the first numbers which when combined with a second number will add up to 4), and replacing the third section letter plates which form correct words in combination with the letter plates of the first and second sections with numerals 4, 3, 2, 1 and 0. Then correct addition combinations would be evidenced by the five B-group rows when the number plates were combined as follows:

$$4 = 0 + 4$$
$$4 = 1 + 3$$
$$4 = 2 + 2$$
$$4 = 3 + 1$$
$$4 = 4 + 0$$

The equal sign and the plus sign could be added at the proper places between the letters by imprinting spacers on the face of the base 12.

Many other mathematical problems could be represented, of course, by merely developing the appropriate number combinations and encoding the number plates by assignment of grid points. In addition, due to its versatility, it can be beneficially used, in fact, for a large variety of other educational purposes, and can be beneficially used wherever it is desirable to teach the association of two or more symbols into correct combinations.

I claim:

1. A method of forming an educational device for assembly of desired combinations of symbols comprising the following steps:

first, providing a plurality of symbol carriers each having identical peripheral dimensions and a face surface with indicia thereon representing a particular symbol;

second, defining a plurality of code points by intersecting a plurality of position lines with a plurality of combination lines to form a grid having the same peripheral dimensions as each of said symbol carriers, each of said grid lines being straight and said combination lines being normal to said position lines, and operatively associating such a grid of code points with each of said symbol carriers;

third, encoding each of said symbol carriers by structural modifications at locations thereon which correspond to code points defined by said grid, so that upon association of a group of said symbol carriers into a desired combination by disposing them in a defined physical relationship each of the associated symbol carriers will have encoded code points located on the same combination line of their respective associated grids.

2. The method defined in claim 1 in which:

said second step includes said position lines being disposed vertically and said combination lines being disposed horizontally, with respect to the symbols on said symbol carrier; and said third step further includes each of the symbol carriers of a desired combination having encoded code points located on the same position line as well as the same combination line of their respective associated grids.

3. The method defined in claim 2, in which:

said third step further includes encoding said symbol carriers by boring holes therein at the location of the code points to be encoded.

4. The method defined in claim 2, in which:

said second step further includes representing said code points by electrical switching means; and
    said third step further includes encoding said symbol carriers by disposing electrical switch actuating means at the location of the code points to be encoded.

5. A method of forming an educational device for assembly of desired combinations of symbols, comprising the following steps:

first, defining a plurality of related symbol areas on a playing surface;

second, providing a plurality of symbol carriers each having identical peripheral dimensions and a face surface with indicia thereon representing a particular symbol;

third, defining a plurality of code points in each of said symbol areas by intersecting a plurality of position lines with a plurality of combination lines to form a grid having the same peripheral dimensions as each of said symbol carriers, each of said grid lines being straight and said combination lines being disposed horizontally and said position lines being disposed vertically with respect to the symbols on said symbol carriers;

fourth, encoding each of said symbol carriers by structural modifications at locations thereon which correspond to code points defined by said grid, so that upon association of a group of said symbol carriers into a desired combination by disposing them in different symbol areas on said playing surface, each of the associated symbol carriers will have encoded code points located on interrelated vertical position lines the same horizontal combination line of the grids in said symbol areas;

fifth, indicating an association of symbol carriers in said symbol areas in a desired combination.

6. The method defined in claim 5 in which:

said first step includes said symbol areas being generally rectangular in shape and positioned side by side on said playing surface for reading left to right by the user;

said second step includes said symbol carriers being generally rectangular in shape to correspond with the shape of said symbol areas, and being structurally arranged to fit in only one of said symbol areas;

said third step includes said grids having at least three vertical position lines and at least three horizontal combination lines superimposed on each of said symbol areas with said horizontal combination lines in each symbol area being aligned with those in other areas; and said fourth step includes each of said symbol carriers of a desired combination having encoded code points located on the same vertical position line as well as the same horizontal combination line of the grids in their respective symbol areas.

7. The method defined in claim 6 in which:

said fourth step includes encoding said code points on said symbol carriers by boring holes therein at the location of the code points to be encoded; and
    said fifth step includes indicating the association of symbol carriers in a desired combination by positioning prongs on a test jig to correspond with bored holes in each of the symbol carriers constituting the desired combination when said symbol carriers are disposed on said symbol areas, side by side in left to right order.

8. The method defined in claim 6 in which:
said fourth step further includes each of said symbol carriers having encoded code points for each desired combination in which said symbol carrier is utilized, whereby for each such desired combination said symbol carrier will have an encoded code point on the same horizontal combination line and vertical position line as the other symbol carriers in said desired combination;
said code points being encoded by boring holes in said symbol carrier at locations which correspond to the code points to be encoded.

9. The method defined in claim 6 in which:
said third step further includes representing each of said code points by electrical switching means;
said fourth step further includes encoding said code points by providing switch actuating means on said symbol carriers at locations corresponding to the code points to be encoded; and
said fifth step further includes providing an electrical power circuit with a power source and an electrically actuated indicator, and interconnecting the electrical switching means for all code points in the same combination line in series in a subcircuit and connecting said sub-circuit to said power circuit.

10. The method defined by claim 5 in which:
said third step further includes representing all code points on a particular position line by electrical switching means, and utilizing a different position line for each symbol area;
said fourth step further includes encoding said symbol carriers by providing switch actuating means on said symbol carriers at locations corresponding to the code points to be encoded; and
said fifth step further includes providing an electrical power circuit with a power source and an electrically actuated indicator, and interconnecting the electrical switching means for all code points in the same combination line in series in a sub-circuit and connecting said sub-circuit to said power circuit.

11. An educational device for forming a desired combination of symbols comprising:
a plurality of symbol carriers each having identical peripheral dimensions and a face surface with indicia thereon representing a particular symbol;
means defining a grid composed of a plurality of code points located at the intersections of a plurality of position lines disposed vertically with respect to symbols on said symbol carriers and a plurality of combination lines disposed horizontally with respect to symbols on said symbol carriers, said lines being straight and said combination lines being normal to said position lines, said grid being operatively associated with each of said symbol carriers;

encoding means on each of said symbol carriers disposed at locations thereon which correspond to code points defined by said grid which have a pre-determined physical relationship with code points on other symbol carriers which form a desired combination when associated in a pre-determined manner, said encoding means being so disposed that encoded code points on each symbol carrier in a desired combination are all on the same combination line of said grid.

12. An educational device as described in claim 11 in which:
said encoding means further includes holes bored in said symbol carriers normal to the face surface thereof at locations corresponding to the code points to be encoded.

13. An educational device as described in claim 11, in which:
said grid defining means includes disposing electrical switching means at said code points; and
said encoding means includes disposing electrical switch actuating means on said symbol carriers at locations corresponding with the location of code points being encoded.

14. An educational device for forming a desired combination of symbols comprising:
a base having a playing surface with a plurality of related symbol areas thereon;
a plurality of symbol carriers each having identical peripheral dimensions and a face surface with indicia thereon representing a particular symbol;
means defining a grid of a plurality of code points operatively associated with said symbol areas and said symbol carriers and formed by the intersections of a plurality of position lines and a plurality of combination lines, said lines being straight and said combination lines being normal to said position lines, said grid having the same peripheral dimensions as said symbol carriers, and said position lines being disposed vertically with respect to symbols on said symbol carriers and said combination lines being disposed horizontally with respect to symbols on said symbol carriers; and
encoding means on each of said symbol carriers disposed to correspond to code points defined by said grid, and being located to establish a predetermined physical relationship when symbol carriers whose symbols form a desire combination are disposed in said symbol areas of said playing surface, said predetermined physical relationship of said encoded code points including all said encoded code points being located on the same combination line of their respective associated grids; and
indicating means operatively associated with said symbol carriers and base and disposed to indicate the formation of a desired combination of symbols.

15. An educational device as described in claim 14, in which:
said symbol areas on said base are generally rectangular in shape and are positioned in side by side relationship on said playing surface for reading from left to right by the user;
said symbol carriers are generally rectangular in shape and correspond with the shape of said symbol areas, and have guide means which relate particular symbol carriers to a particular one of said symbol areas, and prevent placement of such a symbol carrier in any other symbol area;
said grid defining means includes at least three position lines and at least three combination lines, and said grids are superimposed on each of said symbol areas with the horizontal combination lines of each symbol area grid being aligned with those of the other symbol area grids; and
said encoding means includes disposing said encoded code points on said symbol carriers so that the encoded code points in each symbol carrier of a desired combination are all located on the same vertical position line in their respective grids when said symbol carriers are placed in said symbol areas.

16. An educational device as described in claim 15, in which:
said encoding means includes boring holes in said symbol carriers normal to the face surfaces thereof at locations thereon corresponding to the location of the code points being encoded; and
said indicating means includes an elongated bar with a plurality of prongs projecting therefrom, said prongs being equal in number to the number of symbol areas on said playing surface and being disposed to insert into the bored code points of symbol carriers constituting a desired combination when said symbol carriers are disposed in said symbol areas.

17. An educational device as described in claim 15, in which:
said grid defining means includes disposing electrical switching means at each of said code points;
said encoding means includes disposing switch actuating means on each of said symbol carriers at locations corresponding to the locations of code points being encoded; and
said indicating means includes an electrical power circuit having a power source and an electrically actuated indicator, and said electrical switching means of said grid defining means have sub-circuits which interconnect one code point from each symbol area and on the same combination line in series and are in turn connected to said electric power circuit.

18. An educational device as described by claim 14, in which:
said grid defining means includes disposing electrical switching means at code points of said grid utilizing only those code points located on a particular positioning line in each symbol area, and utilizing a different positioning line in each symbol area;
said encoding means includes disposing switch actuating means on said symbol carriers at locations corresponding with the location of the code points being encoded; and
said indicating means includes an electrical power circuit having a power source and an electrically actuated indicator, and said electrical switching means of said grid defining means have sub-circuits which interconnect one code point from each symbol area and on the same combination line in series are in turn connected to said electric power circuit.

* * * * *